UNITED STATES PATENT OFFICE.

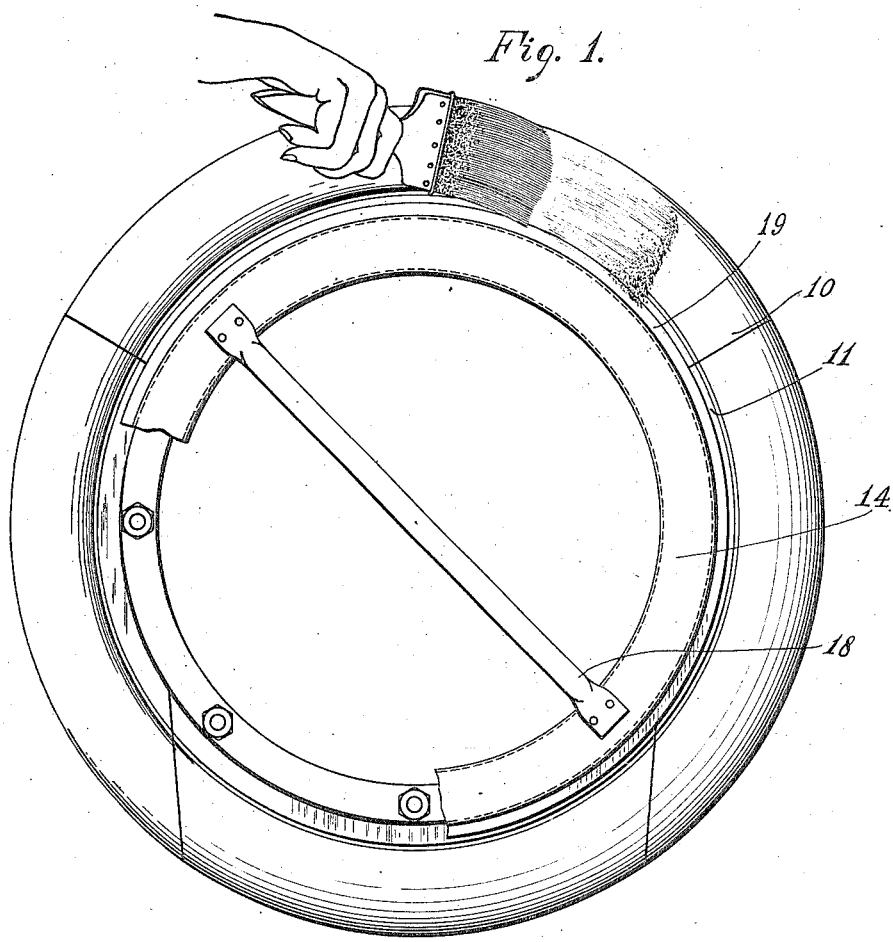
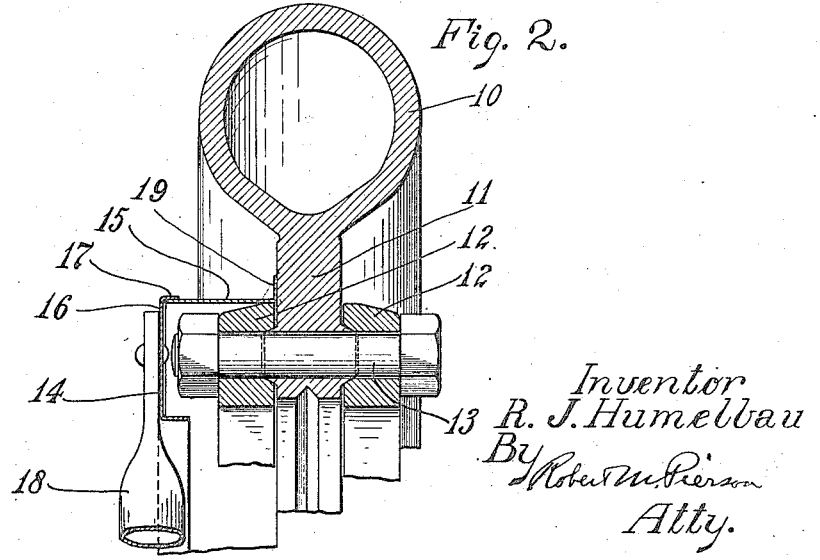

ROBERT J. HUMELBAU, OF AKRON, OHIO, ASSIGNOR TO THE B. F. GOODRICH COMPANY, OF NEW YORK, N. Y., A CORPORATION OF NEW YORK.

CEMENT SHIELD FOR TIRE CORES.

1,424,199.     Specification of Letters Patent.     Patented Aug. 1, 1922.

Application filed August 27, 1920. Serial No. 406,336.

*To all whom it may concern:*

Be it known that I, ROBERT J. HUMELBAU, a citizen of the United States, residing at Akron, in the county of Summit and State of Ohio, have invented a certain new and useful Cement Shield for Tire Cores, of which the following is a specification.

This invention relates to cement shields for tire cores. In the manufacture of pneumatic tire casings, the casing is formed or built up, of rubberized fabric, upon an annular metal core having a body approximately circular in cross-section and a tongue extending radially inward from the inner periphery of said body, the side walls of the tongue lying approximately in radial planes. In using the method of winding the plies of fabric circumferentially on the core and stretching the middle portion of each ply as it is laid, the core is cemented in order to make the first ply stick to its surface, the cement being usually applied with a brush, by hand. It is desirable that the cement be applied only to such part of the core as receives fabric which is to become a part of the tire,—that is, the core should be cemented only down to the trimming line. Otherwise the cement accumulates upon the base, sometimes becoming cured thereon in layers or, through handling, contaminating the finished tire and causing blemishes in vulcanization. To prevent these evils the cores have had to be frequently cleaned, which is a difficult operation constituting a substantial item of expense in a large production.

The object of my invention is to prevent these undesirable results by providing convenient and efficient means for limiting the application of cement to the proper parts of the core.

Of the accompanying drawings:

Fig. 1 is a side view of a collapsible core with a preferred form of my cement shield, in place thereon, and also showing the mode of applying the cement.

Fig. 2 is a cross-section of part of the core and shield.

In the drawings, 10 is the body of the segmental core, 11 is the annular base or tongue extending radially inward therefrom, 12, 12 are clamping rings which, under action of the bolts 13, secure the several segments of the collapsible core together. 14 is the shield. It comprises, as shown, an annular member made, for convenience of construction, in two annular sections, 15 and 16, permanently secured together at 17, and a diametrical brace-handle 18, the section 15 being L-shaped and the section 16 U-shaped in cross-section. The shield is preferably of resilient material, such as galvanized metal. In the form shown, the circumferential member 15 is of such diameter that, being slightly resilient, when placed in position as illustrated it will wedge onto the clamping ring and remain frictionally clamped in position thereon. This member 15 is formed with an outwardly turned portion 19 adapted to fit against the radial wall of the tongue 11 of the core, providing a covering therefor, while the rest of the shield is well out of the operator's way. The shield, being adapted to spring into place and yieldingly embrace the ring 12, is readily applied to and detached from the core, and when in place it provides protection for the portions of the core not covered by the tire without materially interfering with the operator's use of the brush.

The cement may thus be applied with great speed and its application is limited to the proper parts of the core, obviating the evils above mentioned, which have heretofore been encountered in this work.

The handle 18 not only serves as a convenient means of placing, removing and carrying the shield without contaminating the hands, but strengthens the shield and causes it more firmly to embrace the clamping ring 12.

I claim:

1. A cement shield for a tire core, said shield comprising an annular structure adapted to be presented to the side face of the tongue of a tire core to shield the latter and provided with a guiding surface adapted to position it with respect to said tongue.

2. A cement shield for a tire core, said shield comprising a portion adapted to be positioned by and frictionally grip a lateral projection from the tongue of a tire core and an annular flange portion extending outward therefrom and adapted to shield said tongue.

3. In a cement shield for tire cores, a circular member formed with a shielding surface approximately parallel with its axis, and an outwardly-turned portion adapted to fit against the tongue of the tire core.

4. A cement shield for a tire core, said shield comprising an annular member formed with a shielding surface approximately parallel with its axis, and an outwardly turned portion adapted to fit against the tongue of the tire core.

5. A cement shield for a tire core having an annular member adapted to cover the inner side portion of the core tongue, and a diametric bracing and handle member.

In witness whereof I have hereunto set my hand this 11 day of August 1920.

ROBERT J. HUMELBAU.